United States Patent [19]

Matsuzaki et al.

[11] 4,380,620

[45] Apr. 19, 1983

[54] PROCESS FOR PREPARING POLYOXYMETHYLENES

[75] Inventors: Kazuhiko Matsuzaki; Minoru Hamada; Hisaya Sakurai, all of Kurashiki, Japan

[73] Assignee: Asahi Kasei Kogyo Kabushiki Kaisha, Osaka, Japan

[21] Appl. No.: 293,213

[22] PCT Filed: Dec. 16, 1980

[86] PCT No.: PCT/JP80/00307

§ 371 Date: Aug. 12, 1981

§ 102(e) Date: Aug. 12, 1981

[87] PCT Pub. No.: WO81/01712

PCT Pub. Date: Jun. 25, 1981

[51] Int. Cl.³ .............................................. C08G 2/08
[52] U.S. Cl. .................................. 528/232; 525/398; 528/249; 528/250
[58] Field of Search ............... 528/229, 232, 249, 250; 525/398

[56] References Cited

U.S. PATENT DOCUMENTS 3,017,389  1/1962  Langsdorf et al. ................ 528/232
3,436,375  4/1969  McAndrew ........................ 528/250
3,457,228  7/1969  Fischer et al. ..................... 528/250
3,485,799 12/1969  Park ................................... 528/250
3,631,124 12/1971  Burg et al. ......................... 528/250

OTHER PUBLICATIONS

M. Imoto et al., "Formaldehyde—Its Chemistry and Industry", (1965), pp. 65–87.
W. Fukuta et al., "Polymerization of Formaldehyde by Cationic or Anionic Catalyst", (1961), pp. 154–157.
S. J. Barker et al., "Polyacetals", pp. 11–23.

*Primary Examiner*—Lucille M. Phynes
*Attorney, Agent, or Firm*—Birch, Stewart, Kolasch & Birch

[57] ABSTRACT

In a process for preparing polyoxymethylenes by polymerizing formaldehyde in the presence of an anionic polymerization catalyst, the use of a polyhydric alcohol having at least three alcoholic hydroxyl groups in the molecule permits the preparation of polyoxymethylenes which have desired molecular weights along with improved melt fluidity and which are excellent in processability.

20 Claims, No Drawings

PROCESS FOR PREPARING POLYOXYMETHYLENES

TECHNICAL FIELD

The present invention relates to a process for preparing a polyoxymethylene having a desired molecular weight and exhibiting improved melt fluidity and processability. More particularly, it is directed to the preparation of a polyoxymethylene superior in melt fluidity and in processability by polymerizing formaldehyde in the presence of a polyhydric alcohol as a molecular weight regulator.

BACKGROUND ART

It is stated in the specification of British Pat. No. 796,862 that the molecular weight of formaldehyde polymer depends upon the amounts of traces of water, methanol, and formic acid present in the polymerization system. The specification of U.S. Pat. No. 3,017,389 also describes a process for polymerizing formaldehyde in the presence of an anionic initiator and of a chain transfer agent such as a monoester, monohydric alcohol, acid anhydride, amide, or imide. Among the chain transfer agents referred to in these patent specifications, while compounds having a so-called active hydrogen give adequate rates of chain transfer, compounds including monoesters, acid anhydrides, amides, and imides, which have no active hydrogen, possess the disadvantage of showing low rates of chain transfer, which results in unsatisfactory regulation of the molecular weight. Moreover, the use of any of these chain transfer agents including monohydric alcohols as well gives a polyoxymethylene of inadequate melt fluidity and processability. Thus, there is still great room for improvement in these techniques.

On the other hand, U.S. Pat. No. 3,436,375 discloses the polymerization of trioxane or formaldehyde using a cationic polymerization catalyst in the presence of a poly-hydric compound. In the polymerization by use of a cationic polymerization catalyst, there occurs a main chain scission reaction referred to as hydride shift reaction, causing a decrease in molecular weight of the polymer. Additionally, this type of main chain scission occurs significantly in the polymerization of formaldehyde, and it is therefore extremely difficult with a cationic polymerization catalyst to obtain a polyoxymethylene with a sufficiently high molecular weight.

Polyoxymethylenes are widely used as engineering thermoplastics and are usually shaped by using molding techniques such as injection and extrusion. Improvements of polyoxymethylenes in melt fluidity and in processability are expected to develop applications thereof to a great extent.

DISCLOSURE OF THE INVENTION

As a result of extensive studies on the method of regulating the molecular weight of polyoxymethylene, the present inventors found that a polyhydric alcohol having at least three alcoholic hydroxyl groups in the molecule functions as a good molecular weight regulator, and that the produced polymer is excellent in melt fluidity and in processability, and they have accomplished this invention.

The object of the invention is to provide a technique for regulating the molecular weight in the polymerization of formaldehyde and at the same time to provide polyoxymethylenes having excellent melt fluidity and processability.

This object can be attained by polymerizing formaldehyde in the presence of an anionic polymerization catalyst and in the presence of a polyhydric alcohol having at least three alcoholic hydroxyl groups in the molecule.

When formaldehyde is polymerized in the presence of such a polyhydric alcohol, chain transfer and chain branching take place, thereby affecting the molecular weight of the polymer being regulated. The branched polymer thus produced has improved melt fluidity, and as a result it exhibits good processability in extrusion or injection molding.

Branching of polyoxymethylene chains can take place only in the presence of a polyhydric alcohol having at least three alcoholic hydroxyl groups in the molecule because the use of any other alcohol having one or two alcoholic hydroxyl groups gives rise to chain transfer but not chain branching.

BEST MODE FOR CARRYING OUT THE INVENTION

Now the invention is described more precisely.

The polyhydric alcohols available in the process of the invention are compounds having at least three alcoholic hydroxyl groups in the molecule, which include polyols such as triols, tetraols, pentaols, and hexaols.

The first group of the triols include glycerol and alkylene oxide adducts of glycerol which are represented by the formula

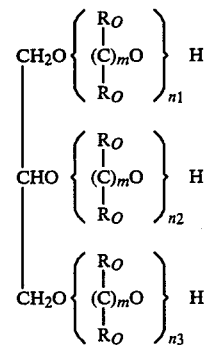

wherein $R_O$, which may be the same or different, represents a group selected from hydrogen, alkyls, substituted alkyls, aryls and substituted aryls; m each independently represents a number of 2 to 6; and $n_1$, $n_2$, and $n_3$ each is a number of 0 to 50; for example, there are cited glycerol, an ethylene oxide adduct of glycerol (average molecular weight 800), a propylene oxide adduct of glycerol (average molecular weight 4,200), an ethylene oxide-propylene oxide mixed adduct of glycerol (average molecular weight 1,830, ethylene oxide/propylene oxide weight ratio=3/1), an isobutylene oxide adduct of glycerol (average molecular weight 820), a tetrahydrofuran adduct of glycerol (average molecular weight 850), and an oxepane adduct of glycerol (average molecular weight 930).

The second group of the triols include trimethylolpropane and alkylene oxide adducts of trimethylolpropane which are represented by the formula

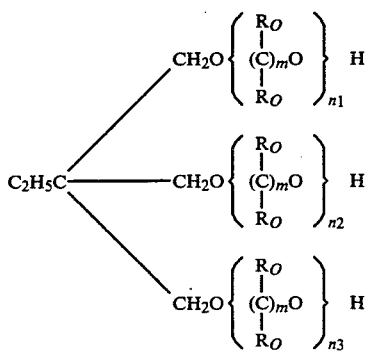

wherein m, $n_1$, $n_2$, $n_3$, and $R_O$ are the same as defined above; for example, there are cited trimethylolpropane, an ethylene oxide adduct of trimethylolpropane (average molecular weight 1,620), a propylene oxide adduct of trimethylolpropane (average molecular weight 4,500), a butylene oxide adduct of trimethylolpropane (average molecular weight 830), and a styrene oxide adduct of trimethylolpropane (average molecular weight 1,150).

The third group of the triols include sorbitan monoesters and alkylene oxide adducts of sorbitan monoesters which are represented by the formula

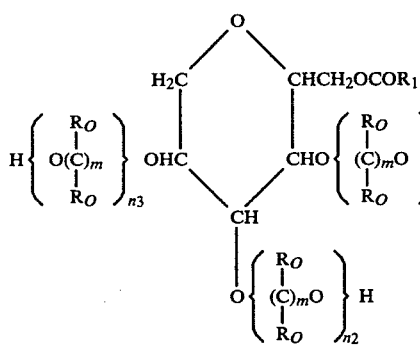

wherein $R_O$, m, $n_1$, $n_2$, and $n_3$ are the same as defined above and $R_1$ is alkyl or aryl; for example, there are cited sorbitan monolaurate, sorbitan monopalmitate, sorbitan monostearate, an ethylene oxide adduct of sorbitan monolaurate (average molecular weight 2,000), a propylene oxide adduct of sorbitan monooleate (average molecular weight 5,300), and an isobutylene oxide adduct of sorbitan monostearate (average molecular weight 2,150).

As a matter of course, the triols available in this invention include, besides the above three groups, the following compounds, each of which has three alcoholic hydroxyl groups in the molecule: for example, 1,2,6-trihydroxyhexane, 1,3,5-trihydroxy-3-methylpentane, diglycerol monostearate, trimethylolethane, 1,1,3-tris-(hydroxyphenyl)propane, a propylene oxide adduct of trimethylolethane (average molecular weight 1,200), and a cyclohexane oxide adduct of trimethylolpropane (average molecular weight 850).

Considering the ease of procurement and of purification, particularly preferred compounds of the above-cited triols are glycerol, its alkylene oxide adducts, trimethylolpropane, its alkylene oxide adducts, sorbitan monoesters, and their alkylene oxide adducts.

The first group of the tetraols include pentaerythritol and alkylene oxide adducts of pentaerythritol, which are represented by the formula

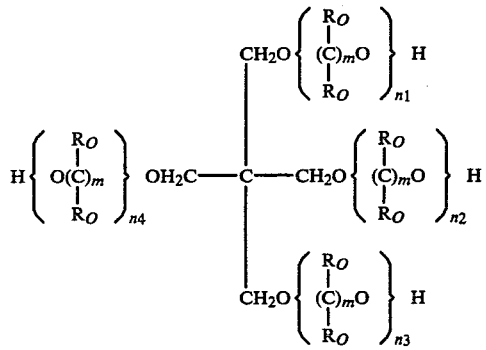

wherein $R_O$, m, $n_1$, $n_2$, and $n_3$ are the same as defined above and $n_4$ is a number of 0 to 50; for example, there are cited pentaerythritol, an ethylene oxide adduct of pentaerythritol (average molecular weight 1,500), a propylene oxide adduct of pentaerythritol (average molecular weight 1,500), a butylene oxide adduct of pentaerythritol (average molecular weight 1,810), and a tetrahydrofuran adduct of pentaerythritol (average molecular weight 1,870).

The second group of the tetraols include diglycerol and alkylene oxide adducts of diglycerol, which are represented by the formula

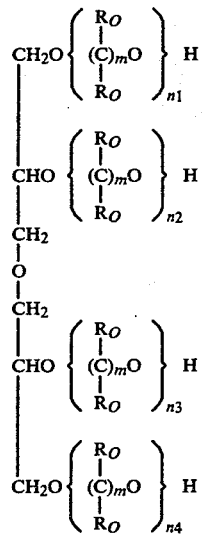

wherein $R_O$, m, $n_1$, $n_2$, $n_3$, and $n_4$ are the same as defined above; for example, there are cited diglycerol, an ethylene oxide adduct of diglycerol (average molecular weight 3,150), and another ethylene oxide adduct of diglycerol (average molecular weight 4,800).

The third group of the tetraols include sorbitan and its derivatives; for example, there are cited 1,5-sorbitan, 1,4-sorbitan, 3,6-sorbitan, an ethylene oxide adduct of 1,5-sorbitan (average molecular weight 2,500), and a propylene oxide adduct of 1,4-sorbitan (average molecular weight 5,800).

As a matter of course, the tetraols available in this invention include, besides the above three groups of tetraols, the following compounds, each of which has four alcoholic hydroxyl groups in the molecule: for example, 1,1,2,2-tetrakis (hydroxyphenyl)ethane and a polyhydroxypolyolefin (average molecular weight 3,100; a polymer having on the average four alcoholic hydroxyl groups in the molecule, prepared by epoxidizing double bonds of a polybutadiene, hydrogenating, followed by opening the epoxide rings).

Of these tetraols, particularly preferred are pentaerythritol, its alkylene oxide adducts, diglycerol, its alkylene oxide adducts, sorbitan, and its alkylene oxide adducts.

The pentaols include the compounds of generic name hexose, for example, fructose and glucose, which have each five alcoholic hydroxy groups in a molecule.

The hexaols include sorbitol, ethylene oxide adducts of sorbitol, and propylene oxide adducts of sorbitol. Other hexaols having each six alcoholic hydroxyl groups in a molecule can of course be used in this invention.

Further, polyols having each seven or more alcoholic hydroxyl groups in a molecule can be used.

These polyhydric alcohols are used for the polymerization separately or in combination. Prior to polymerization, the polyhydric alcohol is preferably purified to remove the contained impurities such as water as far as possible.

Catalysts generally known as anionic polymerization catalysts or coordinated anionic polymerization catalysts can be used for the polymerization of formaldehyde in this invention. As typical examples of the catalysts there are cited alkali metals such as sodium and potassium; alkali metal complexes such as sodiumnaphthalene and potassium-anthracene; alkali metal hydrides such as sodium hydride; alkaline earth metal hydrides such as calcium hydride; alkali metal alkoxides such as sodium methoxide, potassium t-butoxide, and potassium octoxide; alkali metal salts of carboxylic acids such as sodium caproate and potassium stearate; alkaline earth metal salts of carboxylic acids such as magnesium caproate and calcium stearate; amines such as n-butylamine, dibutylamine, distearylamine, trioctylamine, and pyridine; quarternary ammonium salts such as ammonium stearate, tetrabutylammonium methoxide, tetrabutylammonium octanoate, dimethyldistearylammonium acetate, trimethylbenzylammonium acetate, and trimethylbenzylammonium methoxide; phosphonium salts such as tetramethylphosphonium propionate, trimethylbenzylphosphonium ethoxide, and tetrabutylphosphonium stearate; tetra-valent organotin compounds such as tributyltin chloride, diethyltin dilaurate, dibutyltin dimethoxide, dibutyltin dilaurate, dioctyltin dilaurate, and tributyltin laurate; metal alkyls such as n-butyllithium and ethylmagnesium bromide; and organic chelate compounds such as cobalt acetylacetonate.

In this invention, the polymerization is carried out usually in an organic medium. The organic solvents which can be used in the invention include aliphatic hydrocarbons such as n-hexane, n-heptane, and cyclohexane; aromatic hydrocarbons such as benzene, toluene, and xylene; halogenated aliphatic hydrocarbons such as methylene chloride, chloroform, and trichloroethylene; halogenated aromatic hydrocarbons such as chlorobenzene; ether compounds such as ethyl ether and tetrahydrofuran. These organic solvents may be used separately or in combination.

Formaldehyde used in the invention needs to be essentially anhydrous and to be purified by certain known method, for example, such as cold-trap method or solvent washing method.

For the polmerization, a conventional type of process such as gas blowing polymerization process or solution polymerization process can be applied which is known as a process for polymerizing formaldehyde.

The gas blowing polymerization process means a process wherein gaseous formaldehyde is directly blown into an organic medium containing a polymerization catalyst and a polyhydric alcohol. The solution polymerization process means a process wherein formaldehyde is absorbed in a cooled organic medium containing a polyhydric alcohol and then a polymerization catalyst is added to initiate polymerization.

The polyhydric alcohol is used in a uniformly dissolved or dispersed form in an organic medium. The concentration of the polyhydric alcohol in the organic medium can be readily decided by experiment in response to a request for the molecular weight of the polyoxymethylene to be prepared.

The polymerization catalyst is used at a concentration of $1 \times 10^{-2}$ to $1 \times 10^{-6}$ mol/liter of organic medium.

The polymerization temperature is set at a value of $-50°$ to $118°$ C. in gas blowing polymerization process and at a value of $-70°$ to $50°$ C. in solution polymerization process.

The polymerization period which is not particularly limited may be a value of 5 seconds to 300 minutes.

After completion of polymerization, polyoxymethylene is separated from the organic medium, and then treated to cap the unstable chain ends by the known method such as, for example, esterification method, etherification method, or urethanization method. The end-capped polymer is put to practical use after blending of additives such as stabilizers, antioxidants, etc.

The process of this invention hereinbefore explained in detail makes it possible to obtain polyoxymethylenes having desired molecular weights together with characteristics excellent in melt fluidity and in processability.

The features of this invention are as follows:

(1) The molecular weight of polyoxymethylene can be regulated arbitrarily.

(2) Excellent melt fluidity and processability can be given to polyoxymethylene simultaneously with regulated molecular weight.

The invention will be illustrated by the following examples, which are not to be construed to limit the invention. The polymer properties measured and the methods of measurements thereof in the examples are as follows: hereinafter "part" means part by weight.

Reduced viscosity

Measurements were made on solutions of sample polymers in a mixture of p-chlorophenol and tetrachloroethylene (weight ratio 1:1) in a polymer concentration of 0.5 g/dl at 60° C. The reduced viscosities thus determined were taken as a measure of the molecular weight of polyoxymethylene.

M.F.R. (Melt Flow Ratio)

After chain ends of each polymer were capped with acetic anhydride, 0.25 part of 2,2-methylene-bis(4-methyl-6-tert-butylphenol) and 0.75 part of a polycaprolactan/poly(hexamethylene adipamide)/poly(hexamethylene sebacamide)terpolymer were added to 100 parts of the polymer, and the mixture was pelletized using a 50 mmφ extruder. Melt index (MI) of the pellets was measured at 190° C. applying a standard load of 2.16 kg (ASTM-D 1238-57T). Higher load melt index (10×MI) of the pellets was also measured applying a high load of 21.60 kg. Then, M.F.R. of the pellets was determined according to the following equation:
M.F.R.=10×MI/MI The M.F.R. value is a scale indicating the melt fluidity of polyoxymethylene, and it can be said the higher the M.F.R. the better the processability.

EXAMPLE 1

Gaseous formaldehyde of purity 99.9% was obtained by pyrolyzing a thoroughly dehydrated and dried paraformaldehyde at 150° C. and passing the produced gas through a series of several cold traps. The gaseous formaldehyde was introduced at a rate of 100 parts/hr into 500 parts of cyclohexane which contained dioctyltin dilaurate ($2.5 \times 10^{-4}$ mol/l) as a polymerization catalyst and glycerol ($1.8 \times 10^{-3}$ mol/l) as a molecular weight regulator. At the same time, cyclohexane solution of the same composition as the above was fed continuously for 3 hours at a rate of 500 parts/hr. The introduction of gaseous formaldehyde was also continued at the abovementioned rate for 3 hours, during time the polymerization temperature was kept at 40° C. The polymer-containing cyclohexane was continuously withdrawn at a rate to meet the feeding rate, and the polymer was separated by filtration. The polymer was thoroughly washed with acetone and then vacuum-dried into 218 parts of a white polymer. The polymer was found to have a reduced viscosity of 2.38 and so a desired molecular weight. The polymer was then stabilized by end acetylation with acetic anhydride in the presence of sodium acetate as a catalyst. The polyoxymethylene thus stabilized exhibited good thermal stability.

The polymer was found to have a MI of 6.2 (g/10 min), 10×MI of 179.2 (g/10 min), M.F.R. of 28.9; and improved melt fluidity and processability.

EXAMPLES 2–12

In each example, gaseous formaldehyde of purity 99.9% was fed continuously at a rate of 100 parts/hr into 500 parts of hexane containing a polymerization catalyst and a polyhydric alcohol which are shown in Table 1. At the same time, hexane solution of the same composition was fed continuously at a rate of 500 parts/hr for 3 hours, during which time the polymerization temperature was kept at a value shown in Table 1. After separation of the polymer from hexane, the yield and the reduced viscosity were determined M.F.R. of the polymer acetylated with acetic anhydride was measured. The results are also shown in Table 1. In all the examples, the polymers obtained had respective desired molecular weights and were excellent in melt fluidity and in processability.

COMPARATIVE EXAMPLE 1

A polyoxymethylene was prepared in much the same manner as in Example 1 except that octanol was used as a molecular weight regulator in place of glycerol, which was used in Example 1. The results are shown in Table 1. The use of octanol permits molecular weight control of the polymer, but results in a polymer inferior in melt fluidity and in processability to the polymer obtained by use of glycerol.

COMPARATIVE EXAMPLE 2

A polyoxymethylene was prepared in much the same manner as in Example 2 except that octyl propionate was used as a molecular weight regulator in place of an ethylene oxide adduct of trimethylolpropane (average molecular weight 1,620), which was used in Example 2. The results are shown in Table 1. In this case, the molecular weight control is imperfect and simultaneously the melt fluidity and processability are not good.

COMPARATIVE EXAMPLE 3

A polyoxymethylene was prepared in much the same manner as in Example 4 except that diethylene glycol was used as a molecular weight regulator in place of trimethylolpropane, which was used in Example 4. The results are shown in Table 1. In this case, the molecular weight control was possible, but the melt fluidity and processability were not improved.

EXAMPLE 13

Gaseous formaldehyde of purity 99.9% (200 parts) were absorbed into toluene (800 parts) cooled to −20° C. which contained trimethylolpropane ($2.5 \times 10^{-3}$ mol/l). Then, to this solution was added tetrabutylammonium octanoate to a concentration of $5.0 \times 10^{-4}$ mol/l to initiate polymerization. The polymerization temperature was kept at −20° C. for 200 minutes, and then the toluene solution was transferred into a large volume of methanol to stop the polymerization. The polymer was washed with methanol and dried into 183 parts of a white polymer. The reduced viscosity of the polymer was 2.03, which was a desired value. The polymer was found to have a MI of 7.9 (g/10 min), a 10×MI of 224.1 (g/10 min), consequently a M.F.R. of 28.4, and an improved melt fluidity. The results of injection molding of the polymer proved its good processability.

EXAMPLES 14–20

Polyoxymethylenes were prepared in much the same manner as in Example 13 except that the polyhydric alcohols and polymerization catalysts shown in Table 2 were used in place of trimethylolpropane and tetrabutylammonium octanoate, respectively, which were used in Example 13. The results are shown in Table 2. In all the examples, the polyoxymethylenes can be obtained which were found to have respective desired molecular weights and to be excellent in melt fluidity and in processability.

COMPARATIVE EXAMPLES 4 and 5

Polyoxymethylenes were prepared in much the same manner as in Example 13 except that a monool and a diol shown in Table 2 were used respectively in place of trimethylolpropane, which was used in Example 13. The results are shown in Table 2. In either of these comparative examples, the obtained polymer had a desired molecular weight, but was poor in melt fluidity and in processability.

TABLE 1

| Example No. | Polymerization catalyst ($\times 10^{-4}$ mol/l) | | Polyhydric alcohol ($\times 10^{-3}$ mol/l) | | Polymerization temp. (°C.) | Polyoxymethylene | | | | |
|---|---|---|---|---|---|---|---|---|---|---|
| | | | | | | Yield (parts) | Reduced viscosity | MI (g/10 min) | 10 × MI (g/10 min) | M.F.R. |
| 2 | Sodium-naphthalene | 4.8 | Ethylene oxide adduct of trimethylolpropane (av. mol. wt. 1,620) | 2.0 | 50 | 278 | 2.41 | 5.3 | 148.9 | 28.1 |
| 3 | n-Butyllithium | 0.9 | Butylene oxide adduct of trimethylolpropane (av. mol. wt. 830) | 2.0 | 50 | 277 | 2.40 | 5.2 | 144.0 | 27.7 |
| 4 | Tetrabutylphosphonium stearate | 2.5 | Trimethylolpropane | 1.9 | 50 | 276 | 2.40 | 5.2 | 142.5 | 27.4 |
| 5 | Trimethylbenzyl-ammonium methoxide | 2.0 | 1,5-Sorbitan | 1.6 | 53 | 277 | 2.43 | 5.0 | 143.0 | 28.6 |
| 6 | Dioctyltin dilaurate | 1.8 | Pentaerythritol | 1.7 | 50 | 280 | 2.38 | 5.3 | 152.1 | 28.7 |
| 7 | Ethylmagnesium bromide | 6.5 | Propylene oxide adduct of pentaerythritol (av. mol. wt. 1,500) | 1.8 | 50 | 283 | 2.39 | 5.2 | 146.6 | 28.2 |
| 8 | Trimethylbenzyl-ammonium acetate | 2.0 | Diglycerol | 1.8 | 45 | 279 | 2.38 | 5.3 | 148.9 | 28.1 |
| 9 | Potassium octoxide | 4.8 | Isobutylene oxide adduct of glycerol (av. mol. wt. 820) | 2.1 | 45 | 280 | 2.41 | 5.0 | 138.0 | 27.6 |
| 10 | Distearylamine | 13.3 | 1,3,5-Trihydroxy-3-methylpentane | 2.1 | 43 | 281 | 2.40 | 5.2 | 143.0 | 27.5 |
| 11 | Tributyltin laurate | 2.0 | Polyhydroxypolyolefin (av. mol. wt. 3,100, av. no. of hydroxyls contained 4) | 1.7 | 52 | 277 | 2.43 | 5.0 | 140.0 | 28.0 |
| 12 | Dibutylamine | 15.3 | Sorbitan monostearate | 1.9 | 50 | 280 | 2.40 | 5.1 | 140.8 | 27.6 |
| Comp. ex. 1 | Dioctyltin dilaurate | 2.5 | Octanol | 3.0 | 40 | 278 | 2.48 | 9.5 | 146.3 | 15.4 |
| Comp. ex. 2 | Sodium-naphthalene | 4.8 | Octyl propionate | 4.0 | 50 | 279 | 7.03 | 0.7 | 10.4 | 14.9 |
| Comp. ex. 3 | Tetrabutylphosphonium stearate | 2.5 | Diethylene glycol | 1.7 | 50 | 282 | 2.38 | 9.3 | 141.4 | 15.2 |

TABLE 2

| Example No. | Polymerization catalyst ($\times 10^{-4}$ mol/l) | | Polyhydric alcohol ($\times 10^{-3}$ mol/l) | | Polyoxymethylene | | | | |
|---|---|---|---|---|---|---|---|---|---|
| | | | | | Yield (parts) | Reduced viscosity | MI (g/10 min) | 10 × MI (g/10 min) | M.F.R. |
| 14 | Dibutyltin dilaurate | 2.0 | Glycerol | 2.3 | 185 | 1.95 | 7.8 | 220.7 | 28.3 |
| 15 | Tetrabutylammonium methoxide | 1.8 | Polyhydroxypolyolefin (av. mol. wt. 3,100; av. no. of hydroxyls contained 4) | 2.5 | 188 | 1.98 | 7.7 | 197.1 | 25.6 |
| 16 | Potassium-anthracene | 5.2 | Ethylene oxide - propylene oxide mixed adduct of glycerol (av. mol. wt. 1,830) | 2.2 | 189 | 2.05 | 7.4 | 206.5 | 27.9 |
| 17 | Trioctylamine | 8.3 | Ethylene oxide adduct of sorbitan monolaurate (av. mol. wt. 2,000) | 2.3 | 186 | 2.10 | 7.2 | 196.6 | 27.3 |
| 18 | Dimethyldistearyl-ammonium acetate | 2.5 | Tetrahydrofuran adduct of glycerol (av. mol. wt. 850) | 2.3 | 188 | 1.98 | 7.7 | 212.5 | 27.6 |
| 19 | Tetramethylphos-phonium propionate | 3.5 | Cyclohexane oxide adduct of tri-methylolpropane (av. mol. wt. 850) | 2.4 | 189 | 1.99 | 7.7 | 198.7 | 25.8 |
| 20 | Tetramethylphos-phonium propionate | " | Styrene oxide adduct of trimethylol-propane (av. mol. wt. 1,150) | 2.2 | 188 | 2.03 | 7.5 | 190.5 | 25.4 |
| Comp. ex. 4 | Tetrabutylammonium octanoate | 5.0 | Hexanol | 4.2 | 185 | 2.33 | 10.0 | 154.0 | 15.4 |
| Comp. ex. 5 | Tetrabutylammonium octanoate | " | 1,4-Butanediol | 2.9 | 189 | 2.35 | 9.8 | 154.8 | 15.8 |

We claim:

1. A process for preparing polyoxymethylene having a desired molecular weight and improved melt fluidity and processability, which comprises: polymerizing formaldehyde in the presence of an anionic polymerization catalyst and in the presence of a polyhydric alcohol having at least three alcoholic hydroxyl groups in the molecule.

2. A process of claim 1, wherein the polyhydric alcohol is a triol.

3. A process of claim 2, wherein the triol is glycerol or an alkylene oxide adduct of glycerol which is represented by the formula

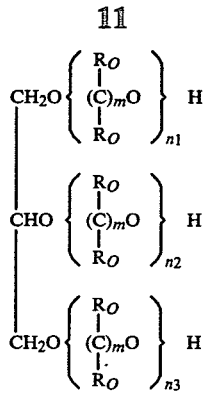

wherein $R_O$, which may be the same or different, each represents a group selected from hydrogen, alkyls, substituted alkyls, aryls and substituted aryls; each m independently represents a number of 2 to 6; and $n_1$, $n_2$, $n_3$ each is a number of 0 to 50.

4. A process of claim 2, wherein the triol is trimethylolpropane or an alkylene oxide adduct of trimethylolpropane which is represented by the formula

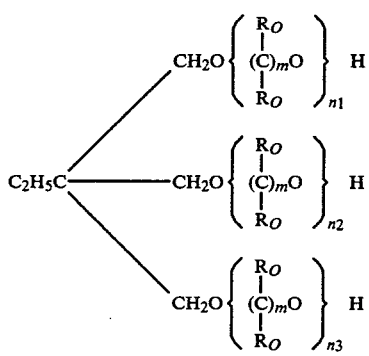

wherein $R_O$, m, $n_1$, $n_2$, and $n_3$ are the same as defined in claim 3.

5. A process of claim 2, wherein the triol is a sorbitan monoester or an alkylene oxide adduct of sorbitan monoester which is represented by the formula

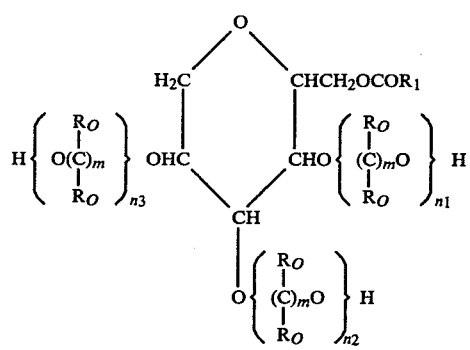

wherein $R_O$, m, $n_1$, $n_2$, and $n_3$ are the same as defined in claim 3, and $R_1$ is alkyl or aryl.

6. A process of claim 1, wherein the polyhydric alcohol is a tetraol.

7. A process of claim 6, wherein the tetraol is pentaerythritol or an alkylene oxide adduct of pentaerythritol which is represented by the formula

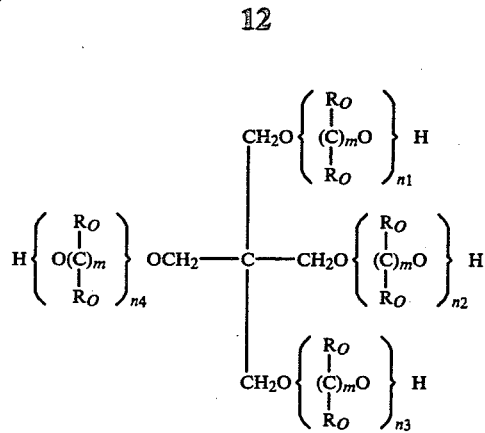

wherein $R_O$, m, $n_1$, $n_2$, and $n_3$ are the same as defined in claim 3, and $n_4$ is a number of 0 to 50.

8. A process of claim 6, wherein the tetraol is diglycerol or an alkylene oxide adduct of diglycerol which is represented by the formula

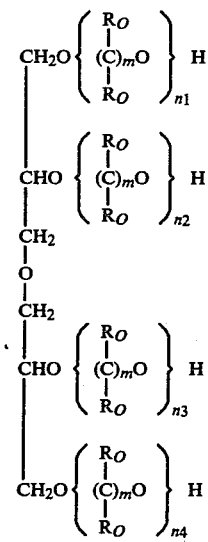

wherein $R_O$, m, $n_1$, $n_2$, $n_3$ and $n_4$ are the same as defined in claim 7.

9. A process of claim 6, wherein the tetraol is sorbitan or an alkylene oxide adduct of sorbitan.

10. A process of claim 1, wherein the polyhydric alcohol is a pentaol.

11. A process of claim 1, wherein the polyhydric alcohol is a hexaol.

12. A process of claim 1, wherein the polymerization is carried out in an organic medium.

13. Polyoxymethylene prepared by the process of claim 1.

14. Polyoxymethylene prepared by the process of claim 1, 2, 6, 10 or 11, having a melt index value measured at 190° C. by applying a standard load of 2.16 kg according to ASTM-D 1238-57T (MI) of from about 5.0 to about 7.8 g/10 min.

15. Polyoxymethylene prepared by the process of claim 1, 2, 6, 10 or 11 having a melt index value measured at 190° C. by applying a standard load of 21.60 kg according to ASTM-D 1238-57T (10×MI) of from about 138.0 to about 220.7 g/10 min.

16. Polyoxymethylene prepared by the process of claim 1, 2, 6, 10 or 11 having a melt index (M.F.R.) value of from about 25.4 to about 28.9.

17. Polyoxymethylene prepared by the process of claim 1, having a melt index value measured at 190° C. by applying a standard load of 2.16 kg according to ASTM-D 1238-57T (MI) of from about 5.0 to about 7.8 g/10 min., having a melt index value measured at 190° C. by applying a standard load of 21.60 kg according to ASTM-D 1238-57T (10×MI) of from about 138.0 to about 220.7 g/10 min. and having a melt index (M.F.R.) value of from about 25.4 to about 28.9.

18. A process for preparing a polyoxymethylene having a desired molecular weight and improved melt fluidity and processability, consisting essentially of: polymerizing formaldehyde in the presence of an anionic polymerization catalyst and in the presence of a polyhydric alcohol having at least three alcoholic hydroxyl groups in the molecule.

19. Polyoxymethylene prepared by the process of claim 18.

20. Polyoxymethylene prepared by the process of claim 18, having a melt index value measured at 190° C. by applying a standard load of 2.16 kg according to ASTM-D 1238-57T (MI) of from about 5.0 to about 7.8 g/10 min., having a melt index value measured at 190° C. by applying a standard load of 21.60 kg according to ASTM-D 1238-57T (10×MI) of from about 138.0 to about 220.7 g/10 min. and having a melt index (M.F.R.) value of from about 25.4 to about 28.9.

* * * * *

UNITED STATES PATENT AND TRADEMARK OFFICE
CERTIFICATE OF CORRECTION

PATENT NO. : 4,380,620
DATED : April 19, 1983
INVENTOR(S) : Kazuhiko MATSUZAKI et al It is certified that error appears in the above-identified patent and that said Letters Patent are hereby corrected as shown below:

In the Heading of the Patent, insert

--[30] Foreign Application Priority Data

Dec. 17, 1979 [JP] Japan................54-163879

Dec. 5, 1980 [JP] Japan................55-171554--

Signed and Sealed this

Twenty-seventh Day of March 1984

[SEAL]

Attest:

GERALD J. MOSSINGHOFF

Attesting Officer          Commissioner of Patents and Trademarks